US012783993B2

(12) United States Patent
Sun

(10) Patent No.: US 12,783,993 B2
(45) Date of Patent: Nov. 3, 2026

(54) WAREHOUSING SYSTEM AND WAREHOUSING CONTROL METHOD APPLIED TO WAREHOUSING SYSTEM

(71) Applicant: Beijing Geekplus Technology Co., Ltd., Beijing (CN)

(72) Inventor: Yi Sun, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 1231 days.

(21) Appl. No.: 17/771,388

(22) PCT Filed: Oct. 29, 2020

(86) PCT No.: PCT/CN2020/124618
§ 371 (c)(1),
(2) Date: Apr. 22, 2022

(87) PCT Pub. No.: WO2021/135582
PCT Pub. Date: Jul. 8, 2021

(65) Prior Publication Data

US 2022/0374829 A1 Nov. 24, 2022

(30) Foreign Application Priority Data

Dec. 30, 2019 (CN) ......................... 201911396802.8

(51) Int. Cl.
*G06Q 10/087* (2023.01)
*B65G 1/137* (2006.01)

(52) U.S. Cl.
CPC ......... *G06Q 10/087* (2013.01); *B65G 1/1373* (2013.01)

(58) Field of Classification Search
CPC .... G06Q 10/087; G06Q 10/08; B65G 1/1373; B65G 1/04
See application file for complete search history.

(56) References Cited

U.S. PATENT DOCUMENTS 5,953,234 A 9/1999 Singer et al.
9,008,827 B1 * 4/2015 Dwarakanath ........ A47F 3/0482 700/214

(Continued)

FOREIGN PATENT DOCUMENTS

CA 3101530 A1 * 12/2019 ......... G06Q 30/0201
CN 103942617 A 7/2014

(Continued)

OTHER PUBLICATIONS

CN109597304 EN translation (Year: 2019).*

(Continued)

*Primary Examiner* — Jacob S. Scott
*Assistant Examiner* — Erin Morris
(74) *Attorney, Agent, or Firm* — Leydig, Voit & Mayer, Ltd.

(57) ABSTRACT

A warehousing system and warehousing control method are disclosed. The warehousing system comprises: an inventory holder, a control module, and a transport device. The inventory holder includes a plurality of layers in the vertical direction, each provided with a plurality of goods locations, where each goods location has a popularity grade. The popularity grade of the goods location is related to the layer, where the goods location is located, and/or the distance between the goods location and an entrance of the inventory holder. The goods location stores goods of which the popularity grade matches the popularity grade of the goods location. For example, the higher the popularity grade of the goods, the higher the in-warehouse/ex-warehouse frequency, so that a transport device can save time when acquiring goods having high popularity grade a plurality of times, improving the efficiency of the transport device in picking up and storing goods.

20 Claims, 6 Drawing Sheets

(56) References Cited

U.S. PATENT DOCUMENTS

| | | | | |
|---|---|---|---|---|
| 2017/0038770 | A1* | 2/2017 | Wurman | G05B 19/4189 |
| 2017/0278055 | A1* | 9/2017 | Winkler | B65G 1/1373 |
| 2019/0266552 | A1* | 8/2019 | Gupta | G06Q 30/0201 |

FOREIGN PATENT DOCUMENTS

| | | | | | |
|---|---|---|---|---|---|
| CN | 106779153 | A | | 5/2017 | |
| CN | 108116829 | A | | 6/2018 | |
| CN | 108550007 | A | | 9/2018 | |
| CN | 109048952 | A | | 12/2018 | |
| CN | 109086921 | A | | 12/2018 | |
| CN | 109460948 | A | | 3/2019 | |
| CN | 109597304 | A | * | 4/2019 | G05B 13/042 |
| CN | 110599087 | A | | 12/2019 | |
| CN | 111158236 | A | * | 5/2020 | G05B 13/042 |
| EP | 2383209 | A1 | * | 11/2011 | G06Q 10/087 |
| JP | H05186005 | | * | 7/1993 | |
| JP | H05186005 | A | | 7/1993 | |
| JP | H05201503 | A | | 8/1993 | |
| JP | 2001354309 | A | * | 12/2001 | |
| WO | 2015056580 | A1 | | 4/2015 | |
| WO | WO-2017068420 | A2 | * | 4/2017 | G06Q 30/0639 |

OTHER PUBLICATIONS

CN109597304_EN_description_with_paragraph_numbers_espacenet (Year: 2019).*

Supplementary Search Report issued in corresponding European Patent Application No. 20909394.7, dated Oct. 25, 2022.

First Office Action issued in corresponding Chinese Patent Application No. 201911396802.8, dated Nov. 25, 2021.

Second Office Action issued in corresponding Chinese Patent Application No. 201911396802.8, dated May 6, 2022.

Written Opinion of the International Searching Authority issued in corresponding PCT Patent Application No. PCT/CN2020/124618, dated Jan. 29, 2021.

* cited by examiner

WAREHOUSING SYSTEM AND WAREHOUSING CONTROL METHOD APPLIED TO WAREHOUSING SYSTEM

CROSS REFERENCE TO RELATED APPLICATIONS

This application is a National Stage of International Application No. PCT/CN2020/124618, filed on Oct. 29, 2020, which claims priority to Chinese Patent Application No. 201911396802.8, filed on Dec. 30, 2019, the disclosures of which are hereby incorporated by reference in their entireties.

TECHNICAL FIELD

The present disclosure generally relates to the technical field of logistics and warehousing, and more particularly, to a warehousing system and a corresponding warehousing control method.

BACKGROUND

In the logistics industry, goods can be stored in a warehouse before being shipped. Specifically, the warehouse includes a plurality of inventory holders, and each inventory holder is provided with a plurality of goods allocation, so that the goods can be placed in the goods allocation of inventory holder. For example, the inventory holder can be a goods shelf including a plurality of goods allocation. When the goods are stored in the warehouse, the same kind of goods are generally placed in a goods allocation, and different types of goods are randomly placed in different goods allocation.

Based on the above method, some goods with high out-put and in-put of warehouse may be randomly placed in a goods allocation that is not easily obtained by a handling device, so that the time cost for the handling device to obtain the goods with high out-put and in-put of warehouse for many times is relatively high, which in turn reduces the efficiency of processing tasks by the handling device.

SUMMARY

Embodiments of the present disclosure provide at least a warehousing system and a corresponding warehousing control method.

In a first aspect, embodiments of the present disclosure provide a warehousing system, including: an inventory holder configured to store goods, in which the inventory holder is provided with a plurality of layers along a vertical direction, and any one of the plurality of layers is provided with a plurality of goods allocations, the goods allocation having a popularity level, the popularity level of the goods allocation being related to a position of the goods allocation located in the inventory holder, the position including at least one of a height position, a lateral position and a depth position; the goods allocation is stored with goods whose popularity level matches the popularity level of the goods allocation; and a control module, configured to in response to a warehousing task, determine a goods allocation hit by the warehousing task, and control taking-out or storage of the goods based on the determined goods allocation hit by the warehousing task.

In an alternative embodiment, the goods stored in the goods allocation are placed in an inventory container located in the goods allocation.

In an alternative embodiment, the warehousing task is an order task of a customer; and the control module is further configured to determine a handling device for executing the order task, and control the handling device to execute the order task based at least in part on a position of a goods allocation hit by an order located in the inventory holder; the handling device in wireless communication with the control module, configured to adjust an execution component to the position of the goods allocation hit by the order located in the inventory holder, and take out goods or take out an inventory container placed with goods in the order based on the control of the control module.

In an alternative embodiment, the warehousing task is a goods storage task. The control module is further configured to in response to the goods storage task, determine an inventory holder for storage of warehousing goods, a popularity level of the warehousing goods, and a popularity level of a goods allocation on the inventory holder; determine a goods allocation whose popularity level matches the popularity level of the warehousing goods based at least in part on the popularity level of the warehousing goods and the popularity level of the goods allocation on the inventory holder, controls the handling device to perform the goods storage task based at least in part on a position of the goods allocation for storage of the warehousing goods located in the inventory holder. The handling device is further configured to adjust an execution component to the position of the goods allocation for storage of the warehousing goods located in the inventory holder, and put the warehousing goods or the inventory container of the warehousing goods in the goods allocation based on the control of the control module.

In an alternative embodiment, the control module is further configured to determine a workstation corresponding to the warehousing task; control the handling device to transport the inventory holder where the goods allocation hit by the warehousing task is located to the workstation; control to send out indication information for indicating the position of the goods allocation hit by the inventory task in the inventory holder, wherein the indication information is configured to instruct to pick up the goods in the goods allocation hit by the warehousing task or to instruct the goods to be put on the goods allocation hit by the warehousing task.

In an alternative embodiment, the popularity level of the goods allocation satisfies at least one of: among a plurality of goods allocations at the same layer, the farther a distance between the goods allocation and an entrance of a passage where the inventory holder is located, the lower the popularity level of the goods allocation; among a plurality of goods allocations at different layers with the same distance from the entrance of the passage where the inventory holder is located, the higher the layer where the goods allocation is located, the lower the popularity level of the goods allocation; and the greater the distance between the layer where the goods allocation is located and a target layer, the lower the popularity level of the goods allocation.

In an alternative embodiment, the control module is further configured to execute at least one of the following logics: determining a popularity level of each goods allocation in the inventory holder based on the consumed time for taking out the goods from each goods allocation in the inventory holder and/or the consumed time for storing the goods to each goods allocation in the inventory holder; and determining a popularity level of each goods allocation in the inventory holder based on a moving distance for taking out the goods from each goods allocation in the inventory holder and/or the moving distance for storing the goods to each goods allocation in the inventory holder.

In an alternative embodiment, the control module is further configured to, for each goods allocation in the inventory holder, determine a popularity level of the goods allocation in the inventory holder based on a sum of the consumed time for the handling device to horizontally move from an entrance position of a passage where the inventory holder is located to a horizontal position corresponding to the goods allocation and the consumed time for an execution component provided on the handling device to vertically move from a bottommost position to a layer position corresponding to the goods allocation.

In an alternative embodiment, the control module is further configured to, for each goods allocation in the inventory holder, determine a popularity level of the goods allocation in the inventory holder based on a sum of a distance for the handling device to horizontally move from an entrance position of a passage where the inventory holder is located to a horizontal position corresponding to the goods allocation and a distance for execution components provided on the handling device to vertically move from a bottommost position to a layer position corresponding to the goods allocation.

In an alternative embodiment, the control module is further configured to, determine a popularity level of each of at least one piece of goods in a time period based on historical order information in the time period; associate identification information of the goods with the popularity level of the corresponding goods and store the associated relationship, wherein the popularity level of the goods is configured to represent a frequency of taking out and storing the goods in the warehouse.

In a second aspect, the embodiments of the present disclosure provide a warehousing control method in a warehousing system. The method includes: in response to a warehousing task, determining a goods allocation on an inventory holder hit by the warehousing task, wherein the inventory holder is provided with a plurality of layers along a vertical direction, and any one of the plurality of layers is provided with a plurality of goods allocations, the goods allocation having a popularity level, the popularity level of the goods allocation being related to a position of the goods allocation located in the inventory holder, the position comprising at least one of a height position, a lateral position, and a depth position; the goods allocation on the inventory holder is stored with goods whose popularity level matches the popularity level of the goods allocation; and controlling taking-out or storing of the goods based on the determined goods allocation hit by the warehousing task.

In an alternative embodiment, the goods stored in the goods allocation are placed in an inventory container located in the goods allocation.

In an alternative embodiment, the warehousing task is an order task of a customer; and controlling taking-out or storing of the goods based on the determined goods allocation hit by the warehousing task includes: determining a handling device for executing the order task; controlling the handling device to execute the order task based at least in part on a position of a goods allocation hit by an order located in the inventory holder; and in response to detecting that the handling device having traveled to the position, controlling the handling device to adjust an execution component to the position of the goods allocation hit by the order located in the inventory holder, and take out goods or take out an inventory container placed with goods in the order.

In an alternative embodiment, the warehousing task is a goods storage task; and the method further includes: in response to the goods storage task, determining an inventory holder for storage of warehousing goods, a popularity level of the warehousing goods, and a popularity level of a goods allocation on the inventory holder; determining a goods allocation whose popularity level matches the popularity level of the warehousing goods based at least in part on the popularity level of the warehousing goods and the popularity level of the goods allocation on the inventory holder; controlling the handling device to perform the goods storage task based at least in part on a position of the goods allocation for storage of the warehousing goods located in the inventory holder; and in response to detecting that the handling device having traveled to the position, controlling the handling device to adjust an execution component to the position of the goods allocation for storage of the warehousing goods located in the inventory holder, and put the warehousing goods or an inventory container placed with the warehousing goods in the goods allocation.

In an alternative embodiment, controlling taking-out or storing of the goods based on the determined goods allocation hit by the order includes: determining a workstation corresponding to the warehousing task; controlling the handling device to transport the inventory holder where the goods allocation hit by the warehousing task is located to the workstation; and controlling to send out indication information for indicating the position of the goods allocation hit by the warehousing task in the inventory holder, wherein the indication information is configured to instruct to pick up the goods in the goods allocation hit by the warehousing task or to instruct the goods to be put on the goods allocation hit by the warehousing task.

In an alternative embodiment, the popularity level of the goods allocation satisfies at least one of: among a plurality of goods allocations at the same layer, the farther a distance between the goods allocation and an entrance of a passage where the inventory holder is located, the lower the popularity level of the goods allocation; among a plurality of goods allocations at different layers with the same distance from the entrance of the passage where the inventory holder is located, the higher the layer where the goods allocation is located, the lower the popularity level of the goods allocation; and the greater the distance between the layer where the goods allocation is located and a target layer, the lower the popularity level of the goods allocation.

In an alternative embodiment, at least one of the following logics is executed to determine the popularity level of the goods allocation in the inventory holder: determining a popularity level of each goods allocation in the inventory holder based on the consumed time for taking out the goods from each goods allocation in the inventory holder and/or the consumed time for storing the goods to each goods allocation in the inventory holder; and determining a popularity level of each goods allocation in the inventory holder based on a moving distance for taking out the goods from each goods allocation in the inventory holder and/or the moving distance for storing the goods to each goods allocation in the inventory holder.

In an alternative embodiment, determining the popularity level of each goods allocation in the inventory holder based on the consumed time for the handling device to take out the goods from each goods allocation in the inventory holder includes: for each goods allocation in the inventory holder, determining a popularity level of the goods allocation in the inventory holder based on a sum of the consumed time for the handling device to horizontally move from an entrance position of a passage where the inventory holder is located to a horizontal position corresponding to the goods allocation and the consumed time for an execution component provided on the handling device to vertically move from a bottommost position to a layer position corresponding to the goods allocation.

In an alternative embodiment, determining the popularity level of each goods allocation in the inventory holder based on the moving distance when the handling device taking out the goods from each goods allocation in the inventory holder includes: for each goods allocation in the inventory holder, determining a popularity level of the goods allocation in the inventory holder based on a sum of a distance for the handling device to horizontally move from an entrance position of a passage where the inventory holder is located to a horizontal position corresponding to the goods allocation and a distance for execution components provided on the handling device to vertically move from a bottommost position to a layer position corresponding to the goods allocation.

In an alternative embodiment, the method further includes: determining a popularity level of each of at least one piece of goods in a time period based on historical order information in the time period; associating identification information of the goods with the popularity level of the corresponding goods, and storing the associated relationship, wherein the popularity level of the goods is configured to represent a frequency of taking out and storing the goods in the warehouse.

In a third aspect, embodiments of the present disclosure provide an electronic device, including: a processor, a memory, and a bus, the memory is stored with machine-readable instructions executable by the processor, when the electronic device is running, the processor communicates with the memory via the bus, and when the machine-readable instructions are executed by the processor, the steps in the method for accessing goods according to the second aspect or any possible embodiment of the second aspect are implemented.

In a fourth embodiment, embodiments of the present disclosure also provide a computer-readable storage medium having stored computer programs. When the computer programs are executed by a processor, the steps in the method for accessing goods according to the second aspect or any possible embodiment of the second aspect are implemented.

With an inventory system and a method for accessing goods according to the embodiments of the present disclosure, the inventory system includes an inventory holder, a control module, and a handling device. The inventory holder is provided with a plurality of layers in a vertical direction, and any one of the plurality of layers is provided with a plurality of goods allocations. The goods allocation has a popularity level. The popularity level of the goods allocation is related to at least one of a layer where the goods allocation is located and a distance between the goods allocation and an entrance to the inventory holder. The goods allocation is stored with goods whose popularity level matches the popularity level of the goods allocation. For example, goods with a high popularity level are stored in a goods allocation close to the entrance of the handling device, so that thee time cost for the handling device to obtain the goods with a higher popularity level under the control of the control module may be lower. The higher the popularity level of the goods, the higher the frequency of out-put and in-put of warehouse, so that it can save more time when the handling device obtains the goods with a high popularity level for many times, thereby improving the frequency of taking out or storing the goods by the handling device.

In order to make the above objects, features and advantages of the present disclosure more obvious and easy to understand, some embodiments are exemplified below, and are described in detail as follows in conjunction with the accompanying drawings.

BRIEF DESCRIPTION OF THE DRAWINGS

In order to explain the technical solutions of the embodiments of the present disclosure more clearly, the accompanying drawings used in the embodiments may be briefly introduced below. The accompanying drawings are incorporated into the specification and constitute a part of the specification. The accompanying drawings illustrate embodiments consistent with the present disclosure, and serve to explain the technical solutions of the present disclosure together with the specification. It should be understood that the following drawings only show some embodiments of the present disclosure, and therefore should not be regarded as a limitation to the scope. Other related drawings may be obtained from these drawings.

DETAILED DESCRIPTION

Figure 1:
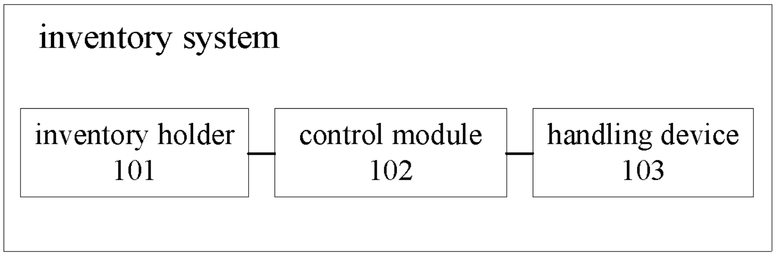
FIG. 1 illustrates a structural schematic diagram of an inventory system according to an embodiment of the present disclosure.

In order to make the objects, technical solutions and advantages of the embodiments of the present disclosure more clear, the technical solutions in the embodiments of the present disclosure may be clearly and completely described below with reference to the accompanying drawings in the embodiments of the present disclosure. Obviously, the described embodiments are only some embodiments of the present disclosure rather than all embodiments. The components in the embodiments of the present disclosure generally described and illustrated in the drawings herein may be arranged and designed in a variety of different configurations. Therefore, the following detailed description in the embodiments of the disclosure according to the accompanying drawings is not intended to limit the claimed scope of the disclosure, but is merely representative of selected embodiments of the disclosure. Based on the embodiments of the present disclosure, all other embodiments that are obtained by those skilled in the art without creative works belong to the protection scope of the present disclosure.

Research has found that when goods are stored in warehouses, the same kind of goods are generally placed in a goods allocation, and different types of goods are randomly placed in different goods allocations. Some goods with high out-put and in-put of warehouse may be randomly placed in a goods allocation that is not easily obtained by the handling device, so that the time cost for the handling device to obtain the goods with high out-put and in-put of warehouse for many times is relatively high, which in turn reduces the efficiency of processing tasks by the handling device. That is, the efficiency of the handling device for picking up and stocking goods is reduced.

Based on the above research, the present disclosure provides an inventory system including an inventory holder, a control module, and a handling device. With the inventory system according to the embodiment of the present disclosure, goods are stored on the inventory holder, in which the inventory holder is provided with plurality of layers along a vertical direction, any one of the plurality of layers is provided with a plurality of goods allocations, and each goods allocation has a popularity level, for example, the popularity level of the goods allocation may be related to at least one of a layer where the goods allocation is located and a distance between the goods allocation and an entrance to the inventory holder (i.e., the entrance to a passage where the inventory holder is located). That is, the popularity level of the goods allocation is related to a position of the goods allocation located in the inventory holder, where the position may include at least one of a height position, a lateral position, and a depth position. The height position may be related to a layer where the goods allocation is located, the higher the height position of a layer, the lower the corresponding popularity level. The lateral position can include a position from a passage entrance. There may be one or two passage entrances. For a one-way passage, there is one passage entrance, and for a two-way passage, there are two passage entrances. For the two passage entrances, the passage entrance closest to the goods allocation can be selected to measure the popularity level of the goods allocation. The inventory holder can have one or more goods allocations in the depth direction. When there are one or two goods allocations in the depth direction, the influence of the depth position on the popularity level of the goods allocation may not be considered. For example, in the case of deploying two goods allocations in the depth direction, the handling device may access goods or an inventory container on a goods allocation A through a passage where the goods allocation A is located, and may access goods or an inventory container on a goods allocation B through a passage where the goods allocation B is located. Therefore, when the inventory holder has one or two goods allocations in the depth direction, it is not necessary to consider the influence of the depth position. When there are more than three goods allocations in the depth direction, the farther the depth position is from the passage, the lower the popularity level of the corresponding goods allocation.

The goods allocation is stored with goods whose popularity level matches the popularity level of the goods allocation. For example, it is possible to store goods with a high popularity level on a goods allocation close to the entrance of the inventory holder, and/or store goods with a high popularity level on a goods allocation at a lower level, so that the time cost for the handling device to obtain the goods with high out-put and in-put of warehouse (the popularity level of the goods is relatively high) for many times is small, and the efficiency of handling device for picking up and stocking goods is improved. For another example, goods with a high popularity level can also be stored in a shelf layer that is convenient for an operator or a picking device to operate. For example, when the operator picks up the goods, a target layer is set based on a general body height of the operator. Alternatively, when the picking device automatically picks up the goods, the target layer is set to a bottom layer or other layer easy to perform fast picking for the picking device. The closer a distance between the layer where the goods allocation is and the target layer, the higher the popularity level of the corresponding goods allocation. In this way, when the operator or picking device picks goods in an order from the inventory holder, the picking efficiency can be improved.

The defects existed in the above solutions are found by the inventor after practice and careful research. Therefore, the discovery process of the above problems and the following solutions to the above problems proposed by the present disclosure should be considered as contributions to this disclosure during the course of this disclosure made by the inventors.

The technical solutions in the present disclosure will be clearly and completely described below with reference to the accompanying drawings in the present disclosure. Obviously, the described embodiments are only a part of embodiments of the present disclosure, but not all of the embodiments. The components of the present disclosure generally described and illustrated in the drawings here may be arranged and designed in a variety of different configurations. Therefore, the following detailed description of the embodiments of the disclosure provided in the accompanying drawings is not intended to limit the claimed scope of the disclosure as, but is merely representative of selected embodiments of the disclosure. Based on the embodiments of the present disclosure, all other embodiments that are obtained by those skilled in the art without creative works belong to the protection scope of the present disclosure.

It should be noted that, similar numerals and letters refer to similar items in the following figures. Once an item is defined in a figure, it does not require further definition and explanation in subsequent figures.

In order to facilitate the understanding of the embodiments of the present disclosure, an inventory system disclosed by the embodiments of the present disclosure is first introduced in detail.

Embodiment 1

In the logistics field, a variety of goods are stored in inventory holders of the warehouse. For example, the inventory holder can be a goods shelf, and the goods are stored in the inventory holders of the warehouse. In order to improve the efficiency of taking out the goods in the inventory holders or to improve the efficiency of storing the goods, embodiments of the present disclosure provide an inventory system.

Specifically, taking-out and storage of the goods can be realized through the inventory system according to the embodiments of the present disclosure. The inventory system includes: an inventory holder, a control module, and a handling device. The inventory holder is configured to store goods. The inventory holder is provided with a plurality of layers along a vertical direction, and any one of the plurality of layers is provided with a plurality of goods allocations.

The goods allocation has a popularity level, and the popularity level of the goods allocation is related to at least one of a layer where the goods allocation is located and a distance of the goods allocation from an entrance to the inventory holder. The goods allocation is stored with goods whose popularity level matches the popularity level of the goods allocation. For example, goods with a high popularity level are stored on a goods allocation close to the entrance of the inventory holder, and/or goods with a high popularity level are stored on a goods allocation at a lower level. In response to an order task of a customer, the control module picks up the goods and controls the handling device to obtain the goods with a high popularity level for a plurality of times, which consumes less time and thus improves the efficiency of taking out the goods in the inventory holders. Alternatively, in response to the received storage task, the control module controls the handling device to store the goods with a high popularity level for a plurality of times, which consumes less time and thus improves the efficiency of storing goods in the inventory holders. In addition, the goods with a high popularity level can also be stored on a shelf layer that is convenient for an operator or a picking device to operate. For example, a target layer is set. The closer the distance between the layer where the goods allocation is located and the target layer, the higher the popularity level of the corresponding goods allocation. In this way, the picking efficiency can be improved when the operator or picking device picks goods in an order from inventory holders.

Referring to FIG. 1, which is a structural schematic diagram of an inventory system according to Embodiment 1 of the present disclosure, the inventory system includes an inventory holder 101, a control module 102, and a handling device 103.

The inventory holder 101 is configured to store goods; in which the inventory holder 101 is provided with plurality of layers along a vertical direction, and any one of the plurality of layers is provided with a plurality of goods allocations. The goods allocation has a popularity level, and the popularity level of the goods allocation is related to at least one of a layer on which the goods allocation is located and a distance between the goods allocation and an entrance of the inventory holder. The goods allocation is stored with goods whose popularity level matches the popularity level of the goods allocation.

The control module 102 is configured to in response to an order task of a customer, determine a goods allocation hit by the order and a handling device for executing the order task, in which the goods allocation hit by the order is stored with goods in the order, plans a travel path for the handling device based at least in part on a position of the goods allocation hit by the order and controls the handling device to travel to the position.

Here, the goods stored in the goods allocation can be placed in a inventory container located in the goods allocation.

The control module 102 controls taking out or storing of the goods based on the determined goods allocation hit by the inventory task, which may include: controlling the handling device to take out the goods from the inventory holder or put the goods into the inventory holder based on the determined goods allocation hit by the inventory task, or may also include instructing a picking device or an operator to pick up the goods in the corresponding goods allocation.

In an embodiment, in a case that the inventory task is an order task, the control module 102 is further configured to determine a handling device for executing the order task, execute the order task for the handling device based at least in part on a position of a goods allocation hit by an order located in the inventory holder, and control the handling device to travel to the position. Accordingly, the handling device 103 wirelessly communicating with the control module is configured to adjust an execution component to the position of the goods allocation hit by the order located in the inventory holder and take out the goods in the order after traveling to the position.

That is, the handling device adjusts the execution component to the position of the goods allocation hit by the order located in the inventory holder, and takes out the goods or an inventory container placed with goods in the order based on the control of the control module.

Here, the control module 102 executes the order task for the handling device based on the position of the goods allocation hit by the order located in the inventory holder, which may include: planning a path for the handling device based on a lateral position of the goods allocation located in the inventory holder. After the handling device reaches the corresponding position based on the planned path, the handling device can also fine-tune the lateral position by adjusting the height position and depth position of the execution component, so that the execution component can accurately reach the position where the goods allocation is located, so as to take out the goods or an inventory container placed with goods in the order at this position.

In the embodiment of the present disclosure, the inventory holder may be a goods shelf, and a plurality of goods allocations are set on the goods shelf. When the goods are stored, the goods can be directly placed on the goods allocations (a baffle can be set on the goods allocation to form a goods compartment, and the goods can be directly placed in the goods compartment), or can be stored in the goods container. The goods container is placed on the goods allocation, in which the goods container can be a pallet or a material box, etc.

In the embodiment of the present disclosure, the inventory holder is provided with a plurality of layers along the vertical direction, and each layer is provided with a plurality of goods allocations. The layer number of the inventory holder and a number of goo ds allocations provided at each layer may be determined based on the volume of the goods, the volume of the goods shelves, etc.. Each goods allocation is provided with a popularity level, and the popularity level of the goods allocation is related to a layer where the goods allocation is located and/or a distance between the goods allocation and an entrance of the inventory holder.

For example, the popularity level of the goods allocation can be set as follows: the higher the layer number for the goods allocation, the lower the popularity level of the goods allocation; and/or, the farther the distance between the goods allocation and the entrance of the inventory holder, the lower the popularity level of the goods allocation.

In the embodiment of the present disclosure, the higher the popularity level of the goods, the higher the frequency of taking out and storing the goods in the warehouse. For example, the popularity level of the goods can be level 1, level 2, level 3, etc. Level 1 is higher than level 2, and level 2 is higher than level 3. That is, goods with a popularity level being the level 1 have a higher frequency of out-put and in-put of warehouse than goods with a popularity level being the level 2.

In this embodiment of the present disclosure, the control module may be a server, a control device with a central processing unit, or the like. When the control module receives the customer's order task, the control module determines a goods allocation hit by the order (the goods in the order are stored in the goods allocation) in response to the customer's order task and a handling device that executes the order task, plans a path for the handling device based at least in part on a position of the goods allocation hit by the order and controls the handling device to travel to the position.

Exemplarily, if there are multiple goods in the order, the goods allocation corresponding to each of the goods can be determined separately, and a goods allocation can be selected from the unselected goods allocations as a target goods allocation (one goods allocation can be randomly selected as the target goods allocation, or a goods allocation with a distance close to the handling device can be selected as the target goods allocation based on a location of the handling device). A travel path is planned for the handling device based on the target goods allocation and the location of the handling device. After the handling device is controlled to move to the target goods allocation for obtaining the goods, a goods allocation is selected from a plurality of unselected goods allocations as a next target goods allocation. The path is re-planned for the handling device based on the current location (i.e., a location of the target goods allocation) of the handling device and the next target goods allocation location until there are no unselected goods allocations among the plurality of goods allocations.

Alternatively, if there are multiple goods in the order, the goods allocation corresponding to each of the goods can be determined separately, and a plurality of handling devices are determined (the number of handling devices is the same as the number of goods in the order), and determine a corresponding goods allocation for each handling device. A travel path is planned for the handling device based on the location of the handling device and the location of the corresponding goods allocation. Each handling device is controlled to move to the corresponding location to pick up the goods.

In the embodiment of the present disclosure, after the handling device travels to the corresponding location, the execution component is adjusted to the position of the goods allocation hit by the order, and the goods in the order are taken out therefrom. For example, if the position of the goods allocation is at the third layer, the execution component is controlled to be adjusted to the position of the third layer and the goods are taken out from the corresponding position.

The inventory system according to the embodiment of the present disclosure includes: an inventory holder, a control module, and a handling device. The inventory holder is provided with a plurality of layers in a vertical direction, and any one of the plurality of layers is provided with a plurality of goods allocations. The goods allocation has a popularity level, and the popularity level of the goods allocation is related to at least one of the layer where the goods allocation is located and the distance between the goods allocation and the entrance of the inventory holder. The goods allocation is stored with goods whose popularity level matches the popularity level of the goods allocation. For example, the goods with a high popularity level are stored in the goods allocation close to the entrance of the handling device, so that the time cost for the handling device to obtain the goods with a high popularity level under the control of the control module may be lower. The higher the popularity level of the goods, the higher the frequency of out-put and in-put of warehouse, so that it can save more time when the handling device obtains the goods with a high popularity level for many times, thereby improving the efficiency of the handling device to pick up the goods.

In an alternative embodiment, in a case that the inventory task is a goods storage task, the control module 102 is further configured to in response to the goods storage task, determine an inventory holder for storage of warehousing goods, a popularity level of the warehousing goods, and a popularity level of a goods allocation on the inventory holder; determine a goods allocation whose popularity level matches the popularity level of the warehousing goods based at least in part on the popularity level of the warehousing goods and the popularity level of the goods allocation on the inventory holder, plan a travel path for the handling device based at least in part on a position of the goods allocation for storage of the warehousing goods, control the handling device to travel to the position (planning a travel path for the handling device based at least in part on a position of the goods allocation in the inventory holder for storage of the warehousing goods, controlling the handling device to travel to the position and perform the goods storage task at this position).

The handling device is further configured to adjust the execution component to the position of the goods allocation for storage of the warehousing goods, and put the warehousing goods into the goods allocation after traveling to the position.

That is, based on the control of the control module, the handling device adjusts the execution component to the position of the goods allocation for storage of the warehousing goods located in the inventory holder, and puts the warehousing goods or an inventory container placed with the warehousing goods into the goods allocation.

Here, the control module 102 controls the handling device to perform the goods storage task based on the position of the goods allocation for storage of the warehousing goods located in the inventory holder, which may include: planning a path for the handling device based on a lateral position of the goods allocation located in the inventory holder. After the handling device reaches the corresponding position based on the planned path, the handling device can also fine-tune the lateral position by adjusting the height position and depth position of the execution component, so that the execution component can accurately reach the position where the goods allocation is located, so as to put the warehousing goods or an inventory container placed with the warehousing goods into the goods allocation.

In the embodiment of the present disclosure, when receiving a goods storage task, the control module determines an inventory holder for storage of the warehousing goods, a popularity level of the warehousing goods, and a popularity level of a goods allocation on the inventory holder in response to the goods storage task, determines a goods allocation whose popularity level matches the popularity level of the warehousing goods based at least in part on the popularity level of the warehousing goods and the popularity level of the goods on the inventory holder, plans a travel path for the handling device based on the position of the goods allocation and the position of the handling device, controls the handling device to travel to the position and stores the goods in the corresponding goods allocation.

In the embodiment of the present disclosure, the popularity level of the goods allocation corresponding to each goods allocation is different, and the goods allocation for storage of the warehousing goods can be determined based on the popularity level of the goods corresponding to the warehousing goods. For example, if the popularity level corresponding to the warehousing goods is level 1, the warehousing goods are stored in the goods allocation with the popularity level being the level 1.

Exemplarily, an inventory holder for storage of warehousing goods may be determined based on the category of goods stored in the set inventory holder. For example, an inventory holder 1 is set to store an electronic device, and an inventory holder 2 is set to store clothing. When the warehousing goods are electronic devices, the inventory holder for storing the warehousing goods is then determined as inventory holder 1. When the warehousing goods are clothing, the inventory holder for storing the warehousing goods is determined as inventory holder 2. When the popularity level of the goods is level 1, the popularity level of the goods allocation being level 1 is determined from the inventory holder and the determined goods allocation is used as the goods allocation for storing the warehousing goods.

Exemplarily, if there are multiple goods to be stored, the goods allocation for storage of warehousing goods corresponding to each of the goods can be separately determined, and one of the plurality of unselected goods allocations can be selected as the target goods allocation (one goods allocation can be randomly selected as the target goods allocation, or a goods allocation with a distance close to the handling device can be also selected as the target goods allocation based on the location of the handling device). The travel path is planned for the handling device based on the target goods allocation and the location of the handling device. After the handling device is controlled to move to the target location and store the goods, a goods allocation is selected from a plurality of unselected goods allocations as a next target goods allocation. The path is re-planned for the handling device based on the current location (i.e., a location of the target goods allocation) of the handling device and the next target goods allocation location until there are no unselected goods allocations among the plurality of goods allocations.

Alternatively, if there are multiple goods to be stored, the goods allocation for storage of warehousing goods corresponding to each of the goods can be separately determined, and a plurality of handling devices (the number of handling devices is the same as the number of goods to be stored). A corresponding goods allocation for storage of the warehousing goods can be determined for each handling device, and for each handling device, a travel path is planned for the handling device based on the location of the handling device and the position of the corresponding goods allocation for storage of the warehousing goods. Each handling device is controlled to move to the corresponding location and store the goods.

In the inventory system according to the embodiment of the present disclosure, the goods allocation on the inventory holder is stored with the goods whose popularity level matches the popularity level of the goods allocation. For example, goods with a high popularity level are stored in the goods allocation close to the entrance of the handling device, so that the time cost for the handling device to obtain the goods with a high popularity level under the control of the control module may be lower. The higher the popularity level of the goods, the higher the frequency of out-put and in-put of warehouse, so that it can save more time when the handling device obtains the goods with a high popularity level for many times, thereby improving the efficiency of the handling device to store the goods.

In addition, as mentioned above, the control module 102 controls taking-out of goods based on the determined position hit by the order, and may further include instructing a picking device or an operator to pick up the goods in the corresponding position based on the determined position hit by the order. Here, the control module 102 may be further configured to determine a workstation corresponding to the inventory task; control the handling device to transport the inventory holder where the goods allocation hit by the inventory task is located to the workstation; control to send out indication information based on the goods allocation hit by the inventory task, in which the indication information is configured to indicate the position of the goods allocation hit by the inventory task in the inventory holder. The indication information is used to instruct to pick up the goods in the goods allocation hit by the inventory task or to instruct the goods put on the goods allocation hit by the inventory task.

For example, the handling device transports the inventory holder where the goods allocation hit by the inventory task is located to the picking workstation, and the operator in the picking workstation picks the goods indicated by the inventory task from the inventory location hit by the inventory task in the inventory holder based on the instructions of the control module 102. Since the goods with a high popularity level can be stored in a goods allocation that is convenient for operators to operate, the picking efficiency can be improved.

Here, the control module 102 controls to send out the indication information for indicating a position of the goods allocation hit by the order in the inventory holder based on the goods allocation hit by the inventory task. Specifically, the control module 102 may control a position indicating device, such as a beam emitting device, to emit laser beam or light beam which points to the goods allocation hit by the inventory task in the inventory holder, and may also display prompt information indicating the position of the goods allocation through a display device, or may prompt the position of the goods allocation hit by the inventory task through a sound.

According to the above description, the popularity level of the above goods allocation can satisfy at least one of: among a plurality of goods allocations at the same layer, the farther a distance between the goods allocation and an entrance of a passage where the inventory holder is located, the lower the popularity level of the goods allocation; among a plurality of goods allocations at different layers with the same distance from the entrance of the passage where the inventory holder is located, the higher the layer where the goods allocation is located, the lower the popularity level of the goods allocation; and the greater the distance between the layer where the goods allocation is located and a target layer, the lower the popularity level of the goods allocation.

Here, the popularity level of the goods allocation can be set as: the higher the layer number of the goods allocation, the lower the popularity level of the goods allocation; the farther the distance between the layer where the goods allocation is located and the entrance of the passage, the lower the popularity level of the goods allocation. It may also be set as: the farther the distance between the layer where the goods allocation is located and the target layer, the lower the popularity level of the goods allocation. The target layer can be set based on the needs, for example, can be set based on the body height of the operator in the picking station. Alternatively, when a picking device is used to perform automatic picking, the target layer is set to the bottommost layer of the inventory holder or other layers that allow the picking device to pick up quickly.

In an alternative embodiment, among a plurality of goods allocations at the same layer, the farther a distance between the goods allocation and the entrance of the inventory container, the lower the popularity level of the goods allocation; among a plurality of goods allocations at different layers with the same distance from the entrance of the inventory container, the higher the layer where the goods allocation is located, the lower the popularity level of the goods allocation.

Figure 2:
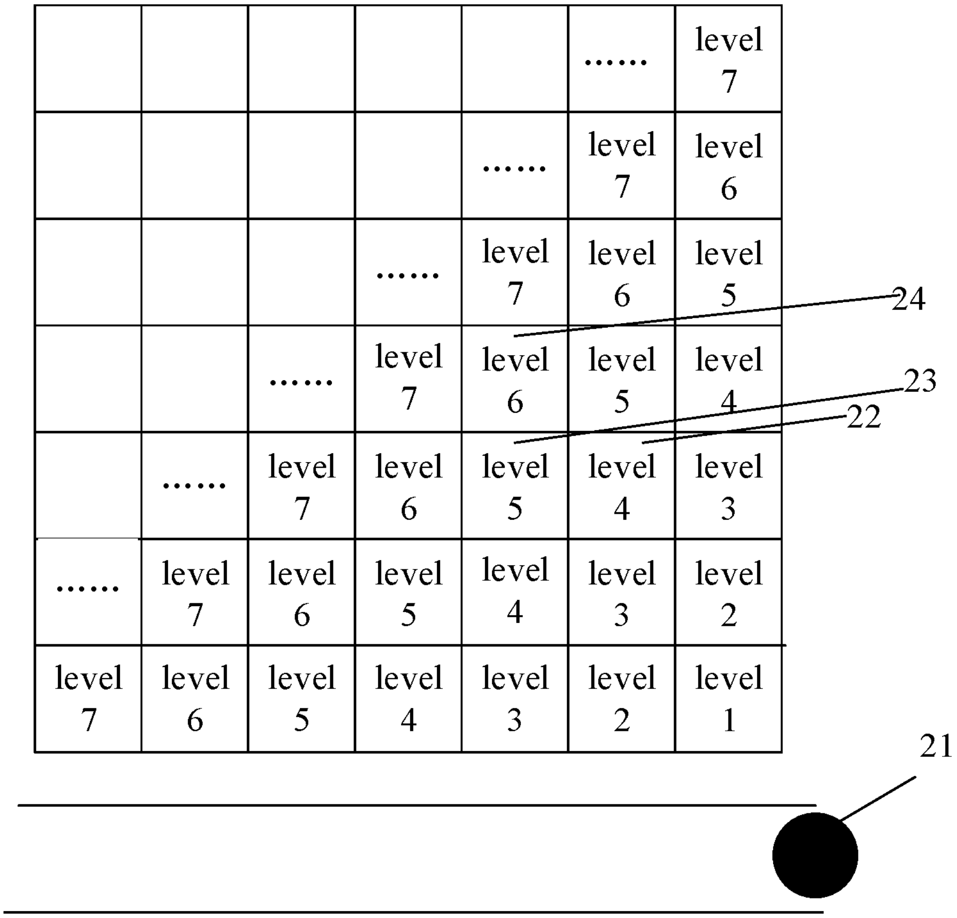
FIG. 2 illustrates a structural schematic diagram of an inventory holder according to an embodiment of the present disclosure.

As shown in FIG. 2 that illustrates a structural schematic diagram of an inventory holder, the inventory container includes seven layers, each layer is provided with seven goods allocations, each goods allocation corresponds to a popularity level, and the position indicated by the circle is an entrance of the inventory container 21. The popularity level corresponding to the goods allocation 22 is level 4, the popularity level corresponding to the goods allocation 23 is level 5, and the popularity level corresponding to the goods allocation 24 is level 6 (the level 5 is higher than the level 6, and the level 6 is higher than the level 7). Since the goods allocation 22 and the goods allocation 23 are located at the same layer, the distance between the goods allocation 23 and the entrance of the inventory container is farther than that of the goods allocation 22 and the inventory container, so the goods allocation 22 has a higher popularity level than the goods allocation 23. The distance between the goods allocation 23 and the inventory container is the same as the distance between the goods allocation 24 and the inventory container while the layer of the goods allocation 24 is higher than that of the goods allocation 23, so the goods allocation 23 has a higher popularity level than the goods allocation 24.

In an alternative embodiment, the control module is further configured to execute at least one of the following logics: determining a popularity level of each goods allocation in the inventory holder based on the consumed time for the handling device to take out the goods from each goods allocation in the inventory holder and/or the consumed time for the handling device to store the goods to each goods allocation in the inventory holder; and determining a popularity level of each goods allocation in the inventory holder based on a moving distance for the handling device to take out the goods from each goods allocation in the inventory holder and/or the moving distance for the handling device to store the goods to each goods allocation in the inventory holder.

In the embodiment of the present disclosure, when the moving speed of the handling device is considered, the popularity level of each goods allocation in the inventory holder may be determined based on the consumed time for the handling device to take out goods from each goods allocation in the inventory holder, and/or the consumed time for the handling device to store the goods to each goods allocation in the inventory holder. Alternatively, when the moving speed of the handling device is not considered, the popularity level of each goods allocation in the inventory holder may be determined based on the moving distance for the handling device to take out the goods from each goods allocation in the inventory holder and/or the moving distance for the handling device to store the goods to each goods allocation in the inventory holder.

In the embodiment of the present disclosure, the popularity level corresponding to each goods allocation may also be determined based on a distance range or a time range. For example, if the distance range corresponding to level 3 is 30 to 50 cm, the moving distance corresponding to the goods allocation C is 35 cm, and the moving distance corresponding to the goods allocation D is 45 cm, then the popularity levels corresponding to the goods allocation C and the goods allocation D are both level 3. Alternatively, if the time range corresponding to level 3 is 3 to 5 seconds, the consumed time of the corresponding location C is 3.5 seconds and the consumed time of the corresponding location D is 4.5 seconds, then the popularity levels corresponding to the goods allocation C and the goods allocation D are both level 3.

In an alternative embodiment, the control module is further configured to for each goods allocation in the inventory holder, determine a popularity level of the goods allocation in the inventory holder based on a sum of the consumed time for the handling device to horizontally move from an entrance position of a passage where the inventory holder is located to a horizontal position corresponding to the goods allocation and the consumed time for an execution component provided on the handling device to vertically move from a bottommost position to a layer position corresponding to the goods allocation.

Figure 3A:
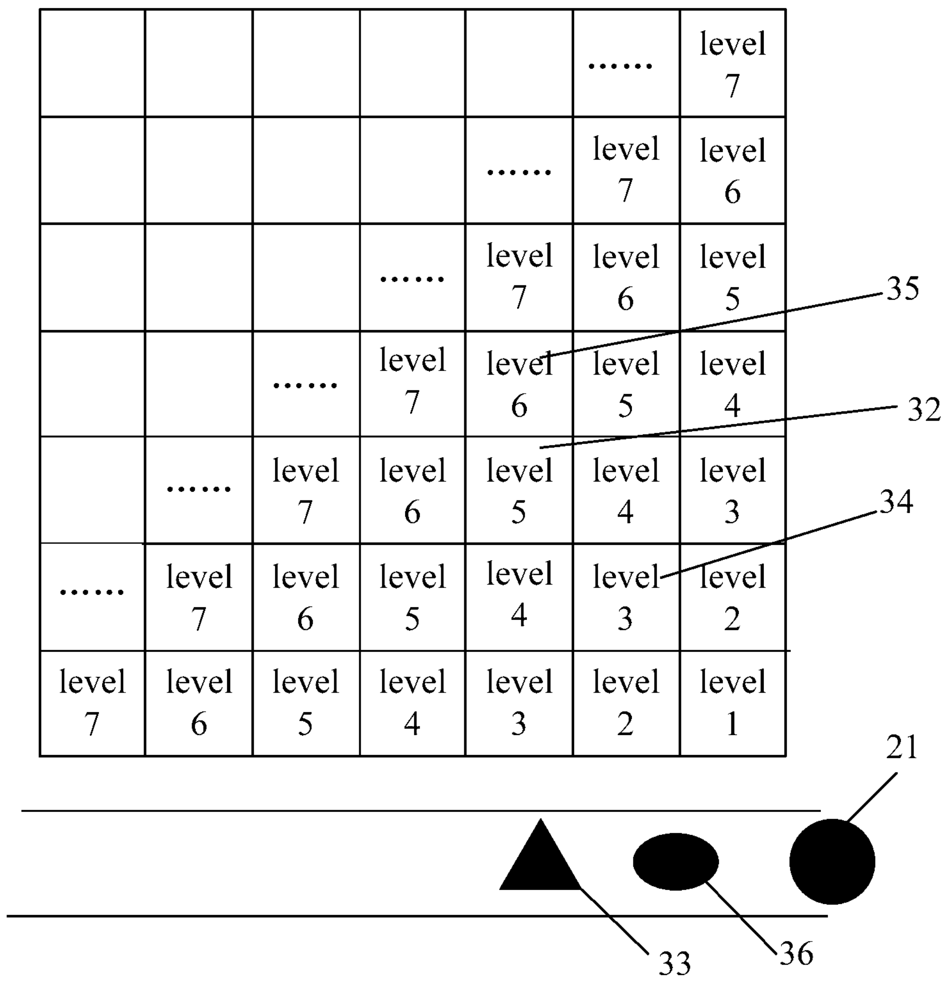
FIG. 3A illustrates a structural schematic diagram of an inventory holder according to an embodiment of the present disclosure.
Figure 3B:
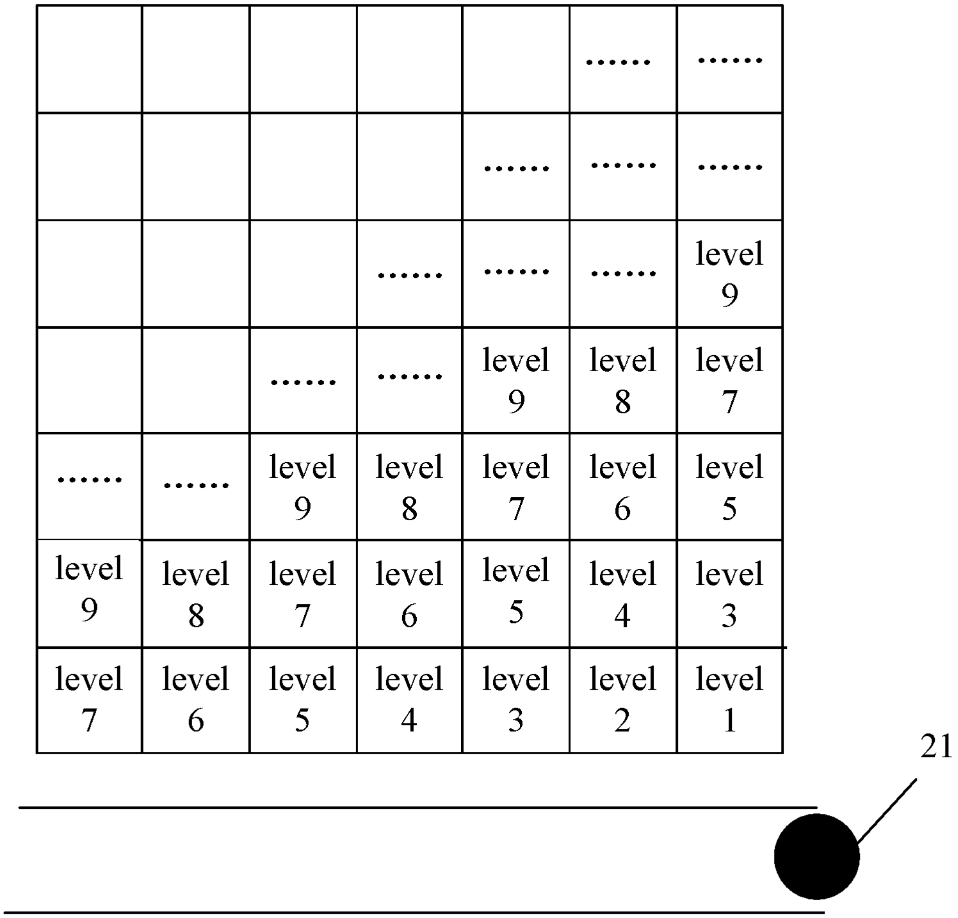
FIG. 3B illustrates a structural schematic diagram of another inventory holder according to an embodiment of the present disclosure.

In the embodiment of the present disclosure, taking an unmanned forklift as an example, the first time consumed for the unmanned forklift to move horizontally from the entrance position of the handling device to the horizontal position corresponding to the goods allocation is determined, and the second time consumed by execution components on the unmanned forklift vertically moving from the bottommost position to the layer position corresponding to the goods allocation is determined. The popularity level corresponding to the goods allocation in the inventory holder is determined based on the sum of the first time and the second time Exemplarily, the inventory holder includes a plurality of goods allocations, and if the horizontal moving speed of the handling device is the same as the vertical moving speed of the executing component (each goods allocation is of a square shape), the popularity level corresponding to each goods allocation in the inventory holder is shown in FIG. 3A. FIG. 3A is a structural schematic diagram of an inventory holder, wherein the position indicated by the circle is the entrance 21 of the handling device. If the horizontal moving speed of the handling device is not the same as the vertical moving speed of the execution component, for example, if the horizontal moving speed of the handling device is twice the vertical moving speed of the execution component set on the handling device (each goods allocation is of a square shape), the popularity level corresponding to each goods allocation in the inventory holder is shown in FIG. 3B. FIG. 3B is a structural schematic diagram of an inventory holder.

Exemplarily, taking the target goods allocation 32 in FIG. 3A as an example, the first time consumed by the handling device that moves from the entrance 21 of the handling device (i.e., the position indicated by the circle) to the horizontal position 33 (i.e., the position indicated by the triangle) corresponding to the target goods allocation 32 is firstly determined. The second time consumed by the execution component set on the handling device that moves from the bottommost position (i.e., the first layer position of the inventory holder) to the layer position (i.e., the third layer position of the inventory holder) corresponding to the target goods allocation 32 is determined. The popularity level corresponding to the goods allocation is determined to be level 5 based on the first time and the second time.

In an alternative embodiment, the control module is further configured to for each goods allocation in the inventory holder, determine a popularity level of the goods allocation in the inventory holder based on a sum of a distance for the handling device to horizontally move from an entrance position of a passage where the inventory holder is located to a horizontal position corresponding to the goods allocation and a distance for execution components provided on the handling device to vertically move from a bottommost position to a layer position corresponding to the goods allocation.

In the embodiment of the present disclosure, taking an unmanned forklift as an example, the first distance that the unmanned forklift horizontally moves from the entrance position of the handling device to the horizontal position corresponding to the goods allocation is determined, and the second distance that a fork on the unmanned forklift vertically moves from the bottommost position to the layer position corresponding to the goods allocation is determined. The popularity level corresponding to the goods allocation in the inventory holder is determined based on the sum of the first distance and the second distance.

Figure 4A:
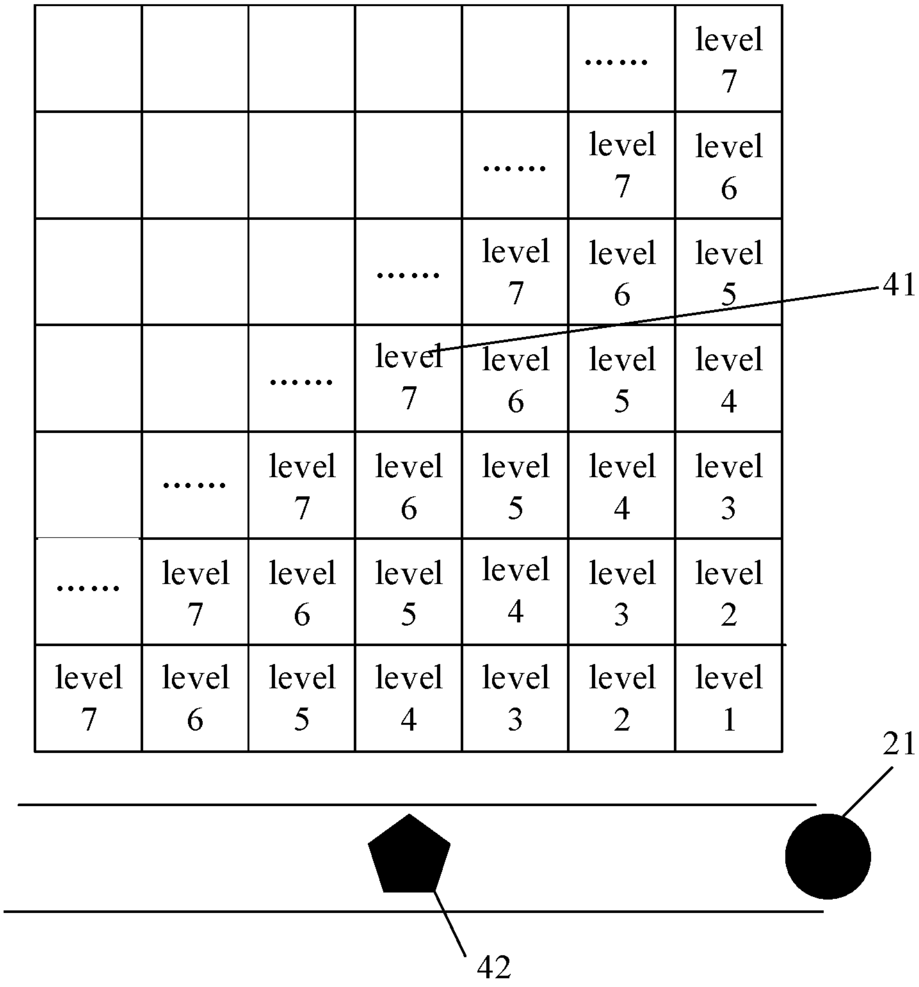
FIG. 4A illustrates a structural schematic diagram of an inventory holder according to an embodiment of the present disclosure.
Figure 4B:
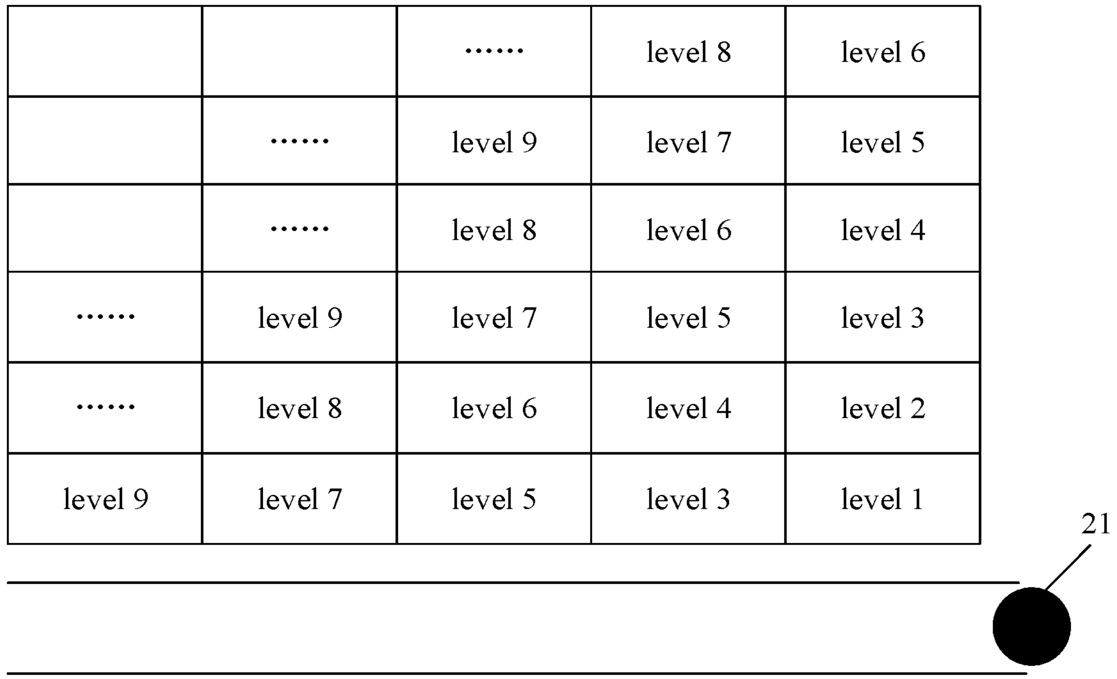
FIG. 4B illustrates a structural schematic diagram of another inventory holder according to an embodiment of the present disclosure.

Exemplarily, as shown in FIG. 4A that is a structural schematic diagram of an inventory holder, the inventory holder includes a plurality of storage goods allocations, each storage goods allocation is of a square shape, and each storage goods allocation in the inventory holder corresponds to a popularity level. As shown in FIG. 4B that is a structural schematic diagram of an inventory holder, the inventory holder includes a plurality of goods allocations, each storage goods allocation is of a rectangle shape (the length of each storage goods allocation is twice the width value), and each goods allocation in the inventory holder corresponds to a popularity level.

Exemplarily, taking the target goods allocation 41 in FIG. 4A as an example, the first distance that the handling device moves from the entrance position 21 of the handling device to the third horizontal position 42 (i.e., the position indicated by a pentagon) corresponding to the target goods allocation 41 is firstly determined. The second distance that the execution component set on the handling device moves from the bottommost position (i.e., the first layer position of the inventory holder) to the corresponding layer position (i.e., the fourth layer position of the inventory holder) of the goods allocation is then determined. The popularity level corresponding to the goods allocation is determined to be level 7 based on the first distance and the second distance.

In this specific implementation, the handling device can be an unmanned forklift, and the goods in each goods allocation of the warehouse are stored on a pallet, so that the unmanned forklift can take out the pallets on the goods allocation stored with the goods, and store the goods placed on the pallet in the corresponding goods allocation. Alternatively, the handling device can also be a reclaimer robot, then the goods in each goods allocation of the warehouse are stored in a material box, so that the reclaimer robot can take out the material box on the goods allocation that stores the goods and store the goods placed within the material box in the corresponding goods allocation. Alternatively, the handling device can be a pickup robot, each goods allocation of the warehouse directly stores the goods, so that the pickup robot can directly take out the goods on the goods allocation and store the goods directly in the corresponding goods allocation.

Exemplarily, take the inventory holder in FIG. 3A as an example for illustration. For example, when the handling device is an unmanned forklift, when a shipment instruction A is received for shipment, goods corresponding to the shipment instruction A are those at first goods allocation 34. The unmanned forklift is firstly controlled to move to the first horizontal position 36 (i.e., the position indicated by an oval). The executive components (such as forks) on the unmanned forklift is controlled to vertically move to the second layer. The pallet (which is placed with goods) is obtained from the first goods allocation 34, and the obtained pallet with the goods placed thereon is moved to the destination. Alternatively, when the shipping instruction A is received for shipment, the goods corresponding to the shipment instruction A are those at first goods allocation 34. The execution components (forks) on the unmanned forklift is firstly controlled to vertically move to the second layer (the height of the vertical movement of the execution components is determined based on the height of each layer and the corresponding number of layers, i.e., the execution components vertically move to the second layer). The unmanned forklift is then controlled to move to the first horizontal position 36 (i.e., the position indicated by an oval). The pallet is obtained from the first goods allocation 34, and the obtained pallet with the goods placed thereon is moved to the destination.

Exemplarily, when a shipment instruction B is received for shipment, goods corresponding to the shipment instruction B are those at the second goods allocation 35. The unmanned forklift is firstly controlled to move to the second horizontal position 33 (i.e., the position indicated by a triangle). The executive components (such as forks) on the unmanned forklift is controlled to vertically move to the fourth layer. The pallet placed with goods is obtained from the second goods allocation 35, and the obtained pallet with the goods placed thereon is moved to the destination.

Based on the above analysis, it can be seen that the time consumed by the unmanned forklift to take out the goods from the second goods allocation 35 is larger than the time consumed by the unmanned forklift to take out the goods from the first goods allocation 34. Alternatively, the distance that the unmanned forklift moves to take out the goods from the second goods allocation 35 is larger than the distance that the unmanned forklift moves to take out the goods from the first goods allocation 34. Therefore, goods with a high frequency of out-put and in-put of warehouse can be stored in the first goods allocation 34, and the goods with a low frequency of out-put and in-put of warehouse can be stored in the second goods allocation 35. That is, the goods with a high popularity level are stored in the first goods allocation 34, and the goods with a low popularity level are stored in the second goods allocation 35. Since the frequency of out-put and in-put of warehouse is high for the goods stored in the first goods allocation 34, there is a situation that the unmanned forklift obtains the goods from the first goods allocation 34 for many times. Therefore, after the goods are stored based on the popularity level of the goods, the time consumed for the unmanned forklift to obtain the goods from the first goods allocation 34 is relatively short, which reduces the time for the handling device to pick up the goods and improves the efficiency of the handling device for picking up the goods.

Exemplarily, when the goods storage task is received to store the goods, goods allocation of warehousing goods is determined based on a popularity level of goods corresponding to the warehousing goods. If the goods location is the goods location A, the unmanned forklift is firstly controlled to obtain a pallet placed with the goods from a pickup position, and to move to a horizontal position corresponding to the goods allocation A. The execution component of the unmanned forklift is then controlled to vertically move to the layer corresponding to the goods allocation A and place the pallet on which the goods are placed in this goods allocation A. Alternatively, after the unmanned forklift is controlled to obtain the pallet placed with the goods at the pickup position, the execution component of the unmanned forklift is firstly controlled to vertically move to the layer corresponding to the goods allocation A. The unmanned forklift or the reclaiming robot is controlled to move to the horizontal position corresponding to the goods allocation A, and place the pallet with the goods in the goods allocation A.

In an alternative embodiment, the control module is further configured to determine a popularity level of each of at least one piece of goods in a time period based on historical order information in the time period; associate identification information of the goods with the popularity level of the corresponding goods and store the associated relationship. The popularity level of the goods is configured to represent a frequency of taking out and storing the goods in the warehouse.

In the embodiment of the present disclosure, the time period may be 3 months, 6 months, or the like. If the time period is 3 months, historical order information in the time period from Mar. 1, 2019 to May 30, 2019 may be obtained on Jun. 1, 2019 and the popularity level of each of the goods (having at least one items) is determined within the time period. The popularity level of the goods can be updated at regular intervals. The update period can be 1 month, 2 months, etc.. If the update period is 1 month, the popularity level of the goods can be updated on Jul. 1, 2019. The updating process may include on Jul. 1, 2019, obtaining historical order information in a time period from Apr. 1, 2019 to Jun. 30, 2019, and determining a popularity level corresponding to each item in the goods (having at least one items), so as to realize the update of the popularity level corresponding to the goods.

In the embodiment of the present disclosure, after the popularity level of each of the goods is determined, the identification information of each of the goods may be associated with the popularity level of the corresponding goods, and the associated relationship may be stored, in which the identification information of the goods may be codes corresponding to a stock keeping unit (SKU) of the goods. Identification codes can also be set for each of the goods, which can be determined as the identification information of the goods. For example, the identification codes can be a combination of numbers and letters. Alternatively, the identification information of the goods may also be information such as the category and model of the goods. Each of the goods corresponds to a piece of identification information, and different goods have different pieces of identification information. During specific implementation, the identification information of the goods may be set based on actual needs, which is not specifically limited in this embodiment of the present disclosure.

Exemplarily, the goods popularity level corresponding to the warehousing goods may be acquired based on the identification information of the warehousing goods. Specifically, after the identification information of the goods is stored in association with the corresponding goods popularity level, the goods popularity level corresponding to the warehousing goods can be determined by using the identification information of the warehousing goods.

Those skilled in the art can understand that, in the above-mentioned system of specific embodiments, the writing order of each step does not mean to constitute any limitation on the implementation by strictly executing the order, and the specific execution order of each step should be based on its function and possible internal logic determination.

Based on the same inventive concept, the embodiment of the present disclosure also provides a method for accessing goods corresponding to the inventory system. Reference can be made to the implementation of the system, which will not be repeated.

Embodiment 2

Figure 5:
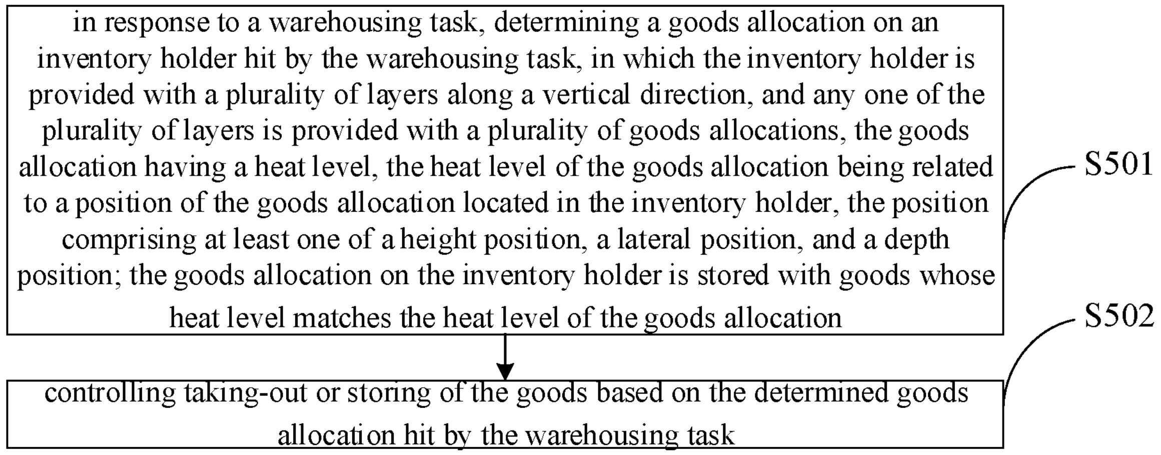
FIG. 5 illustrates a flowchart of a method for accessing goods according to an embodiment of the present disclosure.

Based on the same concept, an embodiment of the present disclosure provides a method for accessing goods. Referring to a flowchart of a method for accessing goods as shown in FIG. 5, the accessing method includes the following steps at S501-S502.

At S501, in response to a customer's order task, a goods allocation on an inventory holder hit by the order and a handling device for executing the order task are determined. The goods allocation hit by the order is stored with goods in the order. The inventory holder is provided with a plurality of layers along a vertical direction, and any one of the plurality of layers is provided with a plurality of goods allocations. The goods allocations on the inventory holder is stored with goods whose popularity level matches a popularity level of the goods allocation.

The control module determines a goods allocation on an inventory holder hit by an inventory task. The inventory holder is provided with a plurality of layers along a vertical direction, and any one of the plurality of layers is provided with a plurality of goods allocations. The goods allocation has a popularity level, and the popularity level of the goods allocation is related to a position of the goods allocation located in the inventory holder, and the position includes at least one of a height position, a lateral position, and a depth position. The goods allocation on the inventory holder is stored with goods whose popularity level matches a popularity level of the goods allocation.

At S502, taking-out or storing of the goods is controlled based on the determined goods allocation hit by the inventory task.

Alternatively, the goods stored in the goods allocation are placed in an inventory container located in the goods allocation.

Alternatively, when the inventory task is an order task, controlling taking-out or storing of the goods based on the determined goods allocation hit by the inventory task may include: determining a handling device for executing the order task; controlling the handling device to execute the order task based at least in part on a position of a goods allocation hit by an order located in the inventory holder; and in response to detecting that the handling device having traveled to the position, controlling the handling device to adjust an execution component to the position of the goods allocation hit by the order located in the inventory holder and take out or an inventory container placed with goods in the order.

Figure 6:
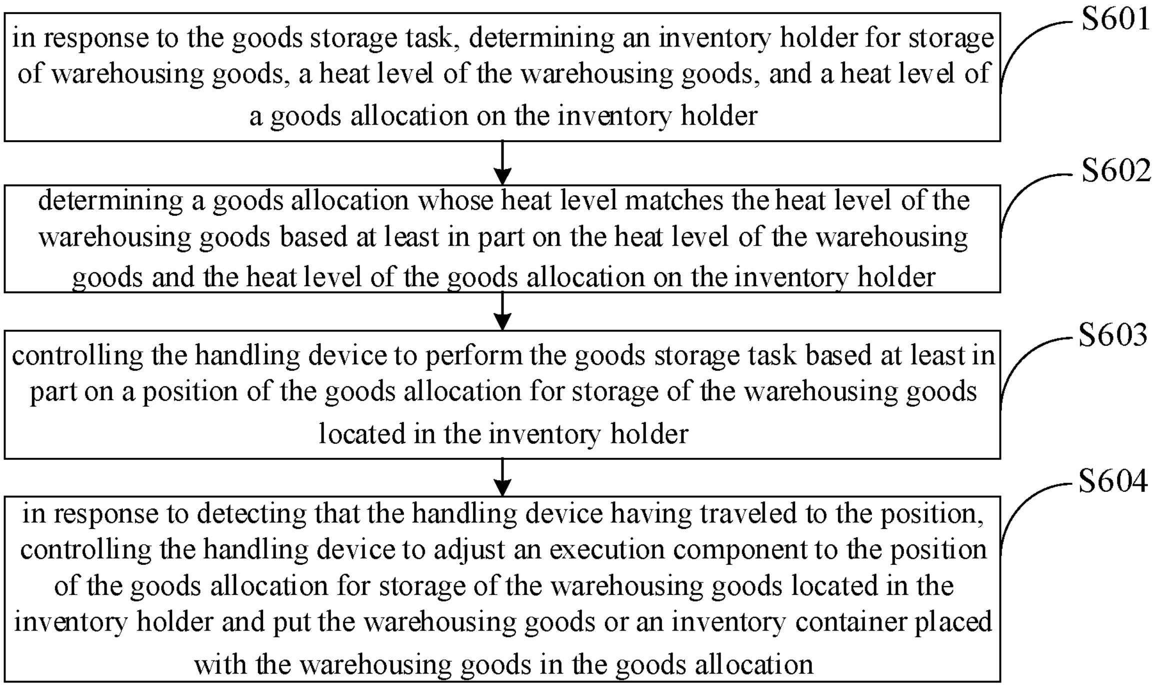
FIG. 6 illustrates a flowchart of a method for warehousing goods in the method for accessing goods according to an embodiment of the present disclosure.

In an alternative embodiment, in a case where the inventory task is a goods storage task. Referring to a flowchart of a method for warehousing goods in the method for accessing goods shown in FIG. 6, the accessing method also includes the following steps at S601-S604.

At S601, in response to the goods storage task, an inventory holder for storage of warehousing goods, a popularity level of the warehousing goods, and a popularity level of a goods allocation on the inventory holder are determined.

At S602, a goods allocation whose popularity level matches the popularity level of the warehousing goods is determined based at least in part on the popularity level of the warehousing goods and the popularity level of the goods allocation on the inventory holder.

At S603, the handling device is controlled to perform the goods storage task based at least in part on a position of the goods allocation for storage of the warehousing goods located in the inventory holder.

At S604, in response to detecting that the handling device having traveled to the position, the handling device is controlled to adjust an execution component to the position of the goods allocation for storage of the warehousing goods located in the inventory holder, and the warehousing goods or an inventory container placed with the warehousing goods are put in the goods allocation.

In an alternative embodiment, controlling the taking out or storing of goods based on the determined goods allocation of the inventory task includes: determining a workstation corresponding to the inventory task; controlling the handling device to transport the inventory holder where the goods allocation hit by the inventory task is located to the workstation; and controlling to send out indication information for indicating the position of the goods allocation hit by the inventory task in the inventory holder, based on the position hit by the inventory task; the indication information is configured to instruct to pick up the goods in the goods allocation hit by the inventory task or to instruct the goods to be put on the goods allocation hit by the inventory task.

In an alternative embodiment, the popularity level of the goods allocation satisfies at least one of the following: among a plurality of goods allocations at the same layer, the farther a distance between the goods allocation and an entrance of a passage where the inventory holder is located, the lower the popularity level of the goods allocation; among a plurality of goods allocations at different layers with the same distance from the entrance of the passage where the inventory holder is located, the higher the layer where the goods allocation is located, the lower the popularity level of the goods allocation; and the greater the distance between the layer where the goods allocation is located and a target layer, the lower the popularity level of the goods allocation.

In an alternative embodiment, at least one of the following logics is executed to determine the popularity level of the goods allocation on the inventory holder: determining a popularity level of each goods allocation in the inventory holder based on the consumed time for taking out the goods from each goods allocation in the inventory holder and/or the consumed time for storing the goods to each goods allocation in the inventory holder; and determining a popularity level of each goods allocation in the inventory holder based on a moving distance for taking out the goods from each goods allocation in the inventory holder and/or the moving distance for storing the goods to each goods allocation in the inventory holder.

In an alternative embodiment, determining the popularity level of each goods allocation in the inventory holder based on the time consumed by the handling device for taking out the goods from each goods allocation in the inventory holder, includes: for each goods allocation in the inventory holder, determining a popularity level of the goods allocation in the inventory holder based on a sum of the consumed time for the handling device to horizontally move from an entrance position of a passage where the inventory holder is located to a horizontal position corresponding to the goods allocation and the consumed time for an execution component provided on the handling device to vertically move from a bottommost position to a layer position corresponding to the goods allocation.

In an alternative embodiment, determining the popularity level of each goods allocation in the inventory holder based on the moving distance for the handling device to take out the goods from each goods allocation in the inventory holder includes: for each goods allocation in the inventory holder, determining a popularity level of the goods allocation in the inventory holder based on a sum of a distance that the handling device horizontally moves from an entrance position of a passage where the inventory holder is located to a horizontal position corresponding to the goods allocation, and a distance that execution components provided on the handling device vertically move from a bottommost position to a layer position corresponding to the goods allocation.

In an alternative embodiment, the access method further includes: determining a popularity level of each of at least one piece of goods in a time period based on historical order information in the time period; and associating identification information of the goods with the popularity level of the corresponding goods, and storing the associated relationship, wherein the popularity level of the goods is configured to represent a frequency of taking out and storing the goods in the warehouse The method for accessing goods according to the embodiment of the present disclosure has the same technical features as the inventory system according to the first embodiment, so it can also solve the same technical problem and achieve the same technical effect.

Embodiment 3

Figure 7:
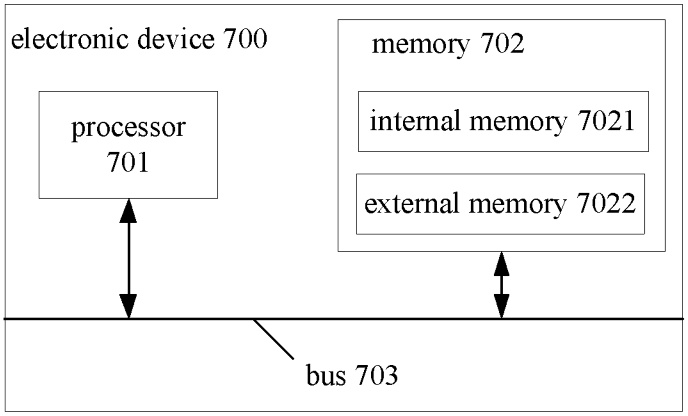
FIG. 7 illustrates a schematic diagram of an electronic device according to an embodiment of the present disclosure.

Based on the same technical concept, an embodiment of the present disclosure also provides an electronic device. Referring to FIG. 7, a structural schematic diagram of an electronic device 700 according to an embodiment of the present disclosure, the electronic device includes a processor 701, a memory 702, and a bus 703. The memory 702 is configured to store execution instructions, including an internal memory 7021 and an external storage 7022. Here, the internal memory 7021 is also called an internal storage, which is configured to temporarily store operation data in the processor 701 and data exchanged with the external memory 7022 such as a hard disk. The processor 701 exchanges data with the external memory 7022 through the internal memory 7021. When the electronic device 700 is running, the processor 701 communicates with the memory 702 through the bus 703, so that the processor 701 is caused to execute the following instructions:

in response to an inventory task, determining a goods allocation on an inventory holder hit by the inventory task, wherein the inventory holder is provided with a plurality of layers along a vertical direction, and any one of the plurality of layers is provided with a plurality of goods allocations, the goods allocation having a popularity level, the popularity level of the goods allocation being related to a position of the goods allocation located in the inventory holder, the position comprising at least one of a height position, a lateral position, and a depth position; the goods allocation on the inventory holder is stored with goods whose popularity level matches the popularity level of the goods allocation; and controlling taking-out or storing of the goods based on the determined goods allocation hit by the inventory task.

In a possible design, the goods stored in the goods allocation are placed in an inventory container located in the goods allocation.

In a possible design, in the instructions executed by the processor 701, the inventory task is an order task; controlling taking-out or storing of the goods based on the determined goods allocation hit by the inventory task includes: determining a handling device for executing the order task; controlling the handling device to execute the order task based at least in part on a position of a goods allocation hit by the order located in the inventory holder; and in response to detecting that the handling device having traveled to the position, controlling the handling device to adjust an execution component to the position of the goods allocation hit by the order located in the inventory holder, and take out goods or take out an inventory container placed with goods in the order.

In a possible design, among the instructions that the processor 701 may execute, the inventory task is a goods storage task; and the method further includes: in response to the goods storage task, determining an inventory holder for storage of warehousing goods, a popularity level of the warehousing goods, and a popularity level of a goods allocation on the inventory holder; determining a goods allocation whose popularity level matches the popularity level of the warehousing goods based at least in part on the popularity level of the warehousing goods and the popularity level of the goods allocation on the inventory holder; controlling the handling device to perform the goods storage task based at least in part on a position of the goods allocation for storage of the warehousing goods located in the inventory holder; and in response to detecting that the handling device having traveled to the position, controlling the handling device to adjust an execution component to the position of the goods allocation for storage of the warehousing goods located in the inventory holder, and put the warehousing goods or an inventory container placed with the warehousing goods in the goods allocation.

In a possible design, among the instructions executed by the processor 701, controlling taking-out or storing of the goods based on the determined goods allocation hit by the inventory task includes: determining a workstation corresponding to the inventory task; controlling the handling device to transport the inventory holder where the goods allocation hit by the inventory task is located to the workstation; and controlling to send out indication information for indicating the position of the goods allocation hit by the inventory task in the inventory holder, wherein the indication information is configured to instruct to pick up the goods in the goods allocation hit by the inventory task or to instruct the goods to be put on the goods allocation hit by the inventory task.

In a possible design, the popularity level of the goods allocation satisfies at least one of the following: among a plurality of goods allocations at the same layer, the farther a distance between the goods allocation and an entrance of a passage where the inventory holder is located, the lower the popularity level of the goods allocation; among a plurality of goods allocations at different layers with the same distance from the entrance of the passage where the inventory holder is located, the higher the layer where the goods allocation is located, the lower the popularity level of the goods allocation; and the greater the distance between the layer where the goods allocation is located and a target layer, the lower the popularity level of the goods allocation.

In a possible design, among the instructions that the processor 701 may execute, it further includes: determining a popularity level of each goods allocation in the inventory holder based on the consumed time for the handling device to take out the goods from each goods allocation in the inventory holder and/or the consumed time for the handling device to store the goods to each goods allocation in the inventory holder; and determining a popularity level of each goods allocation in the inventory holder based on a moving distance for the handling device to take out the goods from each goods allocation in the inventory holder and/or the moving distance for the handling device to store the goods to each goods allocation in the inventory holder.

In a possible design, among the instructions that the processor 701 may execute, it further includes: for each goods allocation in the inventory holder, determining a popularity level of the goods allocation in the inventory holder based on a sum of the consumed time for the handling device to horizontally move from an entrance position of a passage where the inventory holder is located to a horizontal position corresponding to the goods allocation and the consumed time for an execution component provided on the handling device to vertically move from a bottommost position to a layer position corresponding to the goods allocation.

In a possible design, among the instructions that the processor 701 may execute, it further includes: for each goods allocation in the inventory holder, determining a popularity level of the goods allocation in the inventory holder based on a sum of a distance for the handling device to horizontally move from an entrance position of a passage where the inventory holder is located to a horizontal position corresponding to the goods allocation and a distance for execution components provided on the handling device to vertically move from a bottommost position to a layer position corresponding to the goods allocation.

In a possible design, the instructions that the processor 701 may execute, it further includes: determining a popularity level of each of at least one piece of goods in a time period based on historical order information in the time period; associating identification information of the goods with the popularity level of the corresponding goods, and storing the associated relationship, wherein the popularity level of the goods is configured to represent a frequency of taking out and storing the goods in the warehouse.

Embodiment 4

Embodiments of the present disclosure further provide a computer-readable storage medium having a computer program stored thereon. When the computer program is executed by a processor, the steps of the method for accessing goods described in the above method embodiments are carried out. The storage medium may be a volatile or non-volatile computer-readable storage medium.

A computer program product for the method for accessing goods according to the embodiments of the present disclosure includes a computer-readable storage medium having program codes stored thereon. The instructions included in the program codes can be configured to execute the steps of the method for accessing goods described in the above method embodiments. The detailed description may be referred to the above method embodiments and are not repeated here.

Embodiments of the present disclosure also provide a computer program product, which includes a computer program. When the computer program is executed by a processor, any one of the methods in the above embodiments is implemented. The computer program product can be specifically implemented by hardware, software or their combination. In an alternative embodiment, the computer program product is embodied as a computer storage medium. In another alternative embodiment, the computer program product is embodied as a software product, such as a software development kit, etc..

Those skilled in the art can clearly understand that, for the convenience and concision of description, the specific implementation process of the system and apparatus described above may refer to the corresponding process in the above method embodiments, which will not be repeated here. In several embodiments according to the present disclosure, it should be understood that the disclosed system, apparatus and method may be implemented in other manners. The apparatus embodiments described above are only exemplary. For example, the division of units is only a logical function division and there may be other division methods in actual implementation. For another example, a plurality of units or components may be combined or integrated into another system, or some features can be ignored or not implemented. Furthermore, the illustrated or discussed mutual coupling or direct coupling or communication connection may be performed through some communication interfaces, and indirect coupling or communication connection of devices or units may be in electrical, mechanical or other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit.

When the functions are implemented in a form of software functional units and sold or used as stand-alone products, they may be stored in a non-volatile computer-readable storage medium executable by a processor. Based on such understanding, the technical solutions of the present disclosure, or a part of technical solutions that contributes to the related art, or a part of technical solutions, may be embodied in a form of software products in essence. The computer software product is stored in a storage medium, including several instructions configured to cause a computer device (which may be a personal computer, a server, or a network device, etc.) to execute all or part of steps in the methods described in various embodiments of the present disclosure. The aforementioned storage medium includes various media that can store program codes such as. a U disk, a mobile hard disk, a read-only memory (ROM), a random access memory (RAM), a magnetic disk or an optical disk.

Finally, it should be noted that the above-mentioned embodiments are only specific implementations of the present disclosure, and are configured to illustrate rather than limit the technical solutions of the present disclosure. The protection scope of the present disclosure is not limited to the above-mentioned embodiments. Although the present disclosure is described in detail referring to the foregoing embodiments, those skilled in the art should understand that, any person skilled in the art can still modify the technical solutions described in the foregoing embodiments within the technical scope of the present disclosure, or can easily envisage changes, or can make equivalent replacements to some of the technical features. These modifications, changes or replacements do not make the essence of the corresponding technical solutions deviate from the spirit and scope of the technical solutions in the embodiments of the present disclosure, and should be covered within the protection scope of the present disclosure. Therefore, the protection scope of the present disclosure should be based on the protection scope of the claims.

What is claimed is:

1. A warehousing system, comprising:

an inventory holder configured to store goods, wherein the inventory holder is provided with a plurality of layers along a vertical direction, wherein each layer of the plurality of layers is provided with a plurality of goods allocations, wherein each goods allocation of the plurality of goods allocations has a popularity level, and a popularity level of a goods allocation is related to a position of the goods allocation located in the inventory holder, the position comprising at least one of a height position, a lateral position, and a depth position, and wherein the goods allocation is stored with other goods whose popularity level matches the popularity level of the goods allocation; and a processor configured to:

determine, in response to a warehousing task, a goods allocation hit by the warehousing task, and control taking-out or storage of goods based on the goods allocation hit by the warehousing task; and determine the popularity level of each goods allocation in the inventory holder based on:

a consumed time for taking out the goods from each goods allocation in the inventory holder and a consumed time for storing the goods to each goods allocation in the inventory holder; and a moving distance for taking out the goods from each goods allocation in the inventory holder and a moving distance for storing the goods to each goods allocation in the inventory holder;

wherein, for each goods allocation, the consumed time for taking out the goods from the goods allocation in the inventor holder is based on a sum of a first time for a robot to move horizontally from an entrance position of a passage where the inventory holder is located to a horizontal position corresponding to the goods allocation and a second time for the robot to move vertically from a bottommost position to a layer position corresponding to the goods allocation.

2. The system of claim 1, wherein the goods stored in a given goods allocation are placed in an inventory container located in the given goods allocation.

3. The system of claim 1, wherein the robot is in wireless communication with the processor;

wherein the warehousing task is an order task of a customer;

wherein the processor is further configured to identify the robot for executing the order task, and control the robot to execute the order task based on a position of the goods allocation hit by the order task located in the inventory holder; and wherein the robot is configured to adjust to the position of the goods allocation hit by the order task located in the inventory holder, and take out goods or take out an inventory container placed with goods in the order task based on the control of the processor.

4. The system of claim 1, wherein the robot is in wireless communication with the processor;

wherein the warehousing task is a goods storage task;

wherein the processor is further configured to:

determine, in response to the goods storage task, an inventory holder for storage of warehousing goods, a popularity level of the warehousing goods, and the popularity level of the goods allocation in the inventory holder;

determine a goods allocation whose popularity level matches the popularity level of the warehousing goods based on the popularity level of the warehousing goods and the popularity level of the goods allocation in the inventory holder; and control the robot to perform the goods storage task based on a position of the goods allocation for storage of the warehousing goods located in the inventory holder; and wherein the robot is configured to adjust to the position of the goods allocation for storage of the warehousing goods located in the inventory holder, and put the warehousing goods or an inventory container placed with the warehousing goods in the goods allocation based on the control of the processor.

5. The system of claim 1, wherein the robot is in wireless communication with the processor; and wherein the processor is further configured to:

determine a workstation corresponding to the warehousing task;

control the robot to transport the inventory holder where the goods allocation hit by the warehousing task is located to the workstation; and cause indication information to be sent to the robot for indicating the position of the goods allocation hit by the warehousing task in the inventory holder, wherein the indication information is configured to instruct to pick up the goods in the goods allocation hit by the warehousing task or to instruct the goods to be put on the goods allocation hit by the warehousing task.

6. The system of claim 1, wherein the popularity level of the goods allocation satisfies at least one of:

among a plurality of goods allocations at the same layer, the further a distance between the goods allocation and an entrance of the passage where the inventory holder is located, then the lower the popularity level of the goods allocation;

among a plurality of goods allocations at different layers with a same distance from the entrance of the passage where the inventory holder is located, the higher the layer where the goods allocation is located, then the lower the popularity level of the goods allocation; or the greater the distance between the layer where the goods allocation is located and a target layer, then the lower the popularity level of the goods allocation.

7. The system of claim 1, wherein the processor is further configured to:

for each goods allocation in the inventory holder, determine the popularity level of the goods allocation in the inventory holder based on a sum of a first distance for the robot to move horizontally from the entrance position of the passage where the inventory holder is located to the horizontal position corresponding to the goods allocation and a second distance for the robot to move vertically from the bottommost position to the layer position corresponding to the goods allocation.

8. The system of claim 1, wherein the processor is further configured to:

determine the popularity level of each of at least one piece of goods in a time period based on historical order information in the time period; and associate identification information of the goods with the popularity level of the corresponding goods and store the associated relationship, wherein the popularity level of the goods is configured to represent a frequency of taking out and storing the goods in the warehouse.

9. The system of claim 1, wherein the robot is an unmanned forklift, a reclaimer robot, or a pickup robot.

10. A warehousing control method in a warehousing system, the method comprising:

in response to a warehousing task, determining a goods allocation in an inventory holder hit by the warehousing task, wherein the inventory holder is provided with a plurality of layers along a vertical direction, wherein each layer of the plurality of layers is provided with a plurality of goods allocations, wherein each goods allocation of the plurality of goods allocations has a popularity level, and a popularity level of a goods allocation is related to a position of the goods allocation located in the inventory holder, the position comprising at least one of a height position, a lateral position, and a depth position, and wherein the goods allocation in the inventory holder is stored with other goods whose popularity level matches the popularity level of the goods allocation;

controlling taking-out or storing of the goods based on the goods allocation hit by the warehousing task; and determining the popularity level of each goods allocation in the inventory holder based on:

a consumed time for taking out the goods from each goods allocation in the inventory holder and a consumed time for storing the goods to each goods allocation in the inventory holder; and a moving distance for taking out the goods from each goods allocation in the inventory holder and a moving distance for storing the goods to each goods allocation in the inventory holder;

wherein, for each goods allocation, the consumed time for taking out the goods from the goods allocation in the inventor holder is based on a sum of a first time for a robot to move horizontally from an entrance position of a passage where the inventory holder is located to a horizontal position corresponding to the goods allocation and a second time for the robot to move vertically from a bottommost position to a layer position corresponding to the goods allocation.

11. The warehousing control method of claim 10, wherein the goods stored in a given goods allocation are placed in an inventory container located in the given goods allocation.

12. The warehousing control method of claim 10, wherein the warehousing task is an order task of a customer, and controlling taking-out or storing of the goods based on the determined goods allocation hit by the warehousing task comprises:

determining the robot for executing the order task;

controlling the robot to execute the order task based on a position of the goods allocation hit by the order task located in the inventory holder; and in response to detecting that the robot has traveled to the position, controlling the robot to adjust to the position of the goods allocation hit by the order task located in the inventory holder, and take out goods or take out an inventory container placed with goods in the order task.

13. The warehousing control method of claim 10, wherein the warehousing task is a goods storage task, and the method further comprises:

in response to the goods storage task, determining an inventory holder for storage of warehousing goods, a popularity level of the warehousing goods, and the popularity level of the goods allocation in the inventory holder;

determining a goods allocation whose popularity level matches the popularity level of the warehousing goods based on the popularity level of the warehousing goods and the popularity level of the goods allocation in the inventory holder;

controlling the robot to perform the goods storage task based on a position of the goods allocation for storage of the warehousing goods located in the inventory holder; and in response to detecting that the robot has traveled to the position, controlling the robot to adjust to the position of the goods allocation for storage of the warehousing goods located in the inventory holder, and put the warehousing goods or an inventory container placed with the warehousing goods in the goods allocation.

14. The warehousing control method of claim 10, wherein controlling taking-out or storing of the goods based on the goods allocation hit by the warehousing task comprises:

determining a workstation corresponding to the warehousing task;

controlling the robot to transport the inventory holder where the goods allocation hit by the warehousing task is located to the workstation; and cause indication information to be sent to the robot for indicating the position of the goods allocation hit by the warehousing task in the inventory holder, wherein the indication information is configured to instruct the robot to pick up the goods in the goods allocation hit by the warehousing task or to instruct the goods to be put on the goods allocation hit by the warehousing task.

15. The warehousing control method of claim 10, wherein the popularity level of the goods allocation satisfies at least one of:

among a plurality of goods allocations at the same layer, the further a distance between the goods allocation and an entrance of the passage where the inventory holder is located, then the lower the popularity level of the goods allocation;

among a plurality of goods allocations at different layers with a same distance from the entrance of the passage where the inventory holder is located, the higher the layer where the goods allocation is located, then the lower the popularity level of the goods allocation; or the greater the distance between the layer where the goods allocation is located and a target layer, then the lower the popularity level of the goods allocation.

16. The warehousing control method of claim 10, wherein for each goods allocation in the inventory holder, determining the popularity level of the goods allocation in the inventory holder is based on a sum of a first distance for the robot to move horizontally from the entrance position of the passage where the inventory holder is located to the horizontal position corresponding to the goods allocation and a second distance for the robot to move vertically from the bottommost position to the layer position corresponding to the goods allocation.

17. The warehousing control method of claim 10, wherein the method further comprises:

determining the popularity level of each of at least one piece of goods in a time period based on historical order information in the time period; and associating identification information of the goods with the popularity level of the corresponding goods, and storing the associated relationship, wherein the popularity level of the goods is configured to represent a frequency of taking out and storing the goods in the warehouse.

18. The warehousing control method of claim 10, wherein the robot is an unmanned forklift, a reclaimer robot, or a pickup robot.

19. An electronic device, comprising:

a processor; and a memory configured to store machine-readable instructions executable by the processor such that, when the machine-readable instructions are executed by the processor, the steps in the warehousing control method of claim 10 are implemented.

20. A non-transitory computer-readable storage medium having a computer program stored thereon, wherein when the computer program is executed by a processor, the steps in the warehousing control method of claim 10 are implemented.

* * * * *